H. G. NORWOOD

RUBBER CUSHIONED HEEL

Dec. 2, 1930.

Re. 17,890

Original Filed Jan. 15, 1925

Inventor.
Harry G. Norwood
By Chapman & Ferguson
Attorneys.

Reissued Dec. 2, 1930 Re. 17,890

UNITED STATES PATENT OFFICE

HARRY G. NORWOOD, OF BALTIMORE, MARYLAND, ASSIGNOR, BY MESNE ASSIGNMENTS, TO BALLOON RUBBER HEEL CORPORATION, A CORPORATION OF DELAWARE

RUBBER CUSHIONED HEEL

Original No. 1,638,701, dated August 9, 1927, Serial No. 2,632, filed January 15, 1925. Application for reissue filed August 7, 1929. Serial No. 384,055.

The present invention relates to heels which are compounded from rubber stock and are termed "rubber heels." More particularly the present invention relates to a rubber heel-lift which is attached to the bottom of a solid heel.

The principal object of the present invention is to produce a non-slip heel-lift.

To the accomplishment of this object a feature of the present invention contemplates the provision in a heel-lift having a body portion adapted to be attached to a solid heel, said body portion having a tread face and a normally elevated portion projecting therefrom constructed to flatten into the plane of said tread face under pressure, of a rubber means having a greater resiliency than the body portion interposed between the back face of the normally elevated portion and the solid heel for resisting the flattening of the elevated portion.

With this construction the compressed elastic rubber means applies pressure to the back face of the normally elevated portion after it has been flattened into the plane of the tread face and thus causes it to grip the engaged surface, in an excellent non-slip manner.

Other features of the present invention relate to certain devices, combinations and arrangements of parts fully set forth hereinafter, the advantages of which will be readily understood by those skilled in the art.

The various features of the present invention will be readily understood from an inspection of the accompanying drawings, in which, Figure 1 is a sectional elevation of the heel-lift engaged with the solid heel of a shoe, Fig. 2 is a sectional elevation of the heel-lift attached to the solid heel of a shoe;

Figure 1:
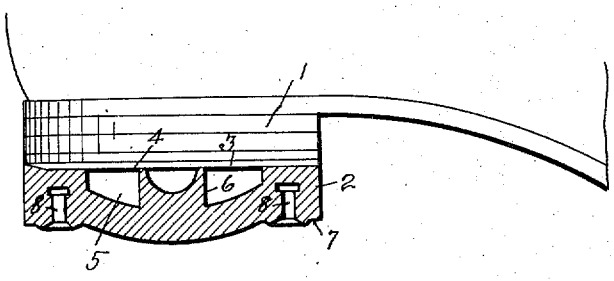

In the embodiment of the invention illustrated in the drawings, the heel-lift 5, as usual, is compounded from rubber stock. The heel-lift 2 is provided with an upper or attaching face 4 and a tread face 7. The attaching face 4 is provided with an inclined peripheral edge 3 and with a heel-shaped central cavity or recess 5 in inwardly spaced relation to the peripheral edge 3. The tread face 7 is provided with a flat marginal portion and a normally elevated portion forming the outer face of the lower wall of the cavity 5. The marginal portion of the tread face is provided with the usual holes 8 having washers 9 through which fastenings 10 are driven to hold the rubber heel in position on the solid heel 1.

The normally elevated portion of the tread face is flattened into the plane of the tread face by the pressure exerted by the wearer in standing or walking. In order to permit this and then to cause the normally elevated portion, after it has been flattened into the plane of the tread face, to grip the ground, the back face of the normally elevated portion is provided with a post or cushioning element 6. In the embodiment of the present invention illustrated in the drawings, the post 6 is hollowed out on its upper end to form a cup the peripheral edge of which engages the solid heel. This construction renders the post more resilient than the body portion of the heel-lift.

Figure 2:
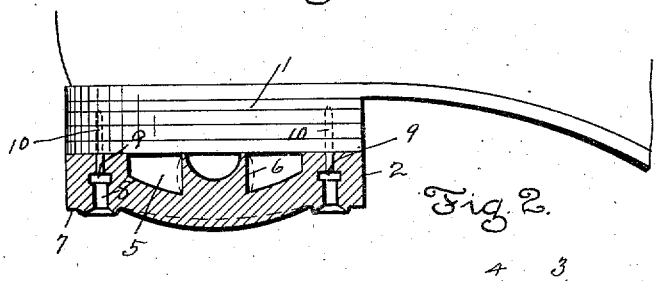
Figure 3:
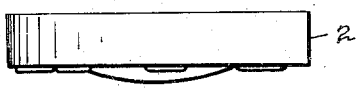
Fig. 3 is an elevation of the heel-lift.
Figure 4:
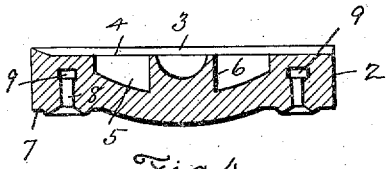
Fig. 4 is a sectional elevation of the heel-lift.
Figure 5:
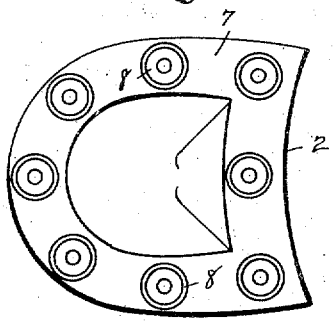
Fig. 5 is a bottom plan of the heel-lift.
Figure 6:
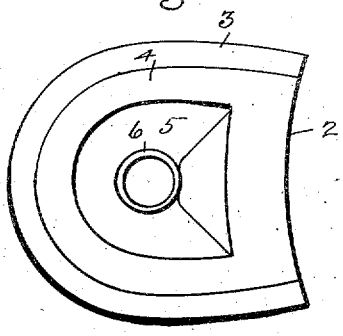
Fig. 6 is a plan of the heel-lift.

The cushioning element 6 is integrally connected to the back face of the normally elevated portion and rises clear of the walls of the cavity 5 substantially to the plane of the attaching face. When the rubber heel-lift 2 is to be applied to the solid heel it is placed in the position shown in Fig. 1 and then drawn up into the position shown in Fig. 2 by the fastenings 10. The beveled edge causes the heel-lift to fit tightly to the solid heel and accommodates itself to any unevenness and affords a neat straight surface around the outer edge of the solid heel. With this construction, the cushioning element 6 has a normal inactive engagement with the solid heel 1 when the heel-lift 2 is applied thereto. That is, the cushioning element 6 exerts normally no pressure on the back face of the normally elevated portion. As soon, however, as pressure is exerted on the normally elevated portion, tending to flatten it into the plane of the tread face, the cushioning element is compressed and expands into the recess 5 as shown in dotted lines, Fig. 2.

The cushioning element compresses readily during the flattening movement of the normally elevated portion and yields sufficiently to permit the normally elevated portion to flatten in to the plane of the tread face. This because the post 6, which is hollowed out on the upper end, has a greater resiliency than the body portion of the rubber heel 2 and offers comparatively slight resistance initially to the compression of the rubber heel due to the thin peripheral edge of the former being then in contact with the shoe heel. As the weight of the walker is brought down on the heel, however, the compression of the post 6 follows but the resistance to compression gradually increases due to the increasing thickness, lower down the post, of the annular portion resulting from cupping or dishing the upper face of the post. Full compression of the heel finally transfers the pressure to the full body of the post at which time resistance to depression of the under face of the heel is greatest. Thus, the particular form of post provided serves as a means to increasingly resist upward pressure on the lower surface of the heel as well as to offer an abnormal resistance to upward pressure just prior to the convexed portion reaching the plane of the lower surface of the heel.

Without the post, the concavity 5 is substantially volumetrically equal to that portion of the heel constituting the bulged or convexed portion and thus the air chamber provided by the concavity is sufficient to entrap the necessary quantity of air to effect a substantial resistance to upward movement of the bulged or convexed portion, this resistance being greater than that afforded by the material of the bulged or convexed portion itself.

It will be apparent to those skilled in the rubber-heel art that changes may be made in the details of construction, the described and illustrated embodiment of the invention being intended as an exploitation of its underlying essentials, the features whereof will be definitely stated in their true scope in the claims hereto appended.

What is claimed as new, is:

1. A cushion heel, comprising a resilient heel body of rubber having a tread surface, an upper surface, and a peripheral surface, said upper surface being provided with a recess in inwardly spaced relation to said peripheral surface, and a cushioning element also of rubber and of greater resiliency than said heel body disposed in said recess, and substantially integrally connected to the heel body, said heel having a space in relation to said cushioning element into which said element expands in its compressed relation.

2. A cushion heel, comprising a resilient heel body having a tread surface, an upper surface, and a peripheral surface, said upper surface being provided with a recess in inwardly spaced relation to said peripheral surface, and a cushioning element of greater resiliency than said heel body having its upper surface substantially flush with the upper surface of said heel body disposed in said recess in inwardly spaced relation to the wall of said recess to form an air pocket surrounding said cushioning element, said cushioning element adapted to expand into said air pocket in its compressed relation.

3. A cushion heel, comprising a resilient heel body having a tread surface, an upper surface, and a peripheral surface, cushioning means of greater resiliency than said heel body within said heel in inwardly spaced relation to said peripheral surface, and projecting means on said tread surface in opposed relation to said cushioning means adapted upon pressure being applied against said tread surface to compress said cushioning means.

4. A rubber heel-lift having a body portion adapted to be attached to a solid heel, said body portion having a tread face and a normally elevated portion projecting therefrom constructed to flatten into the plane of said tread face under pressure, and a rubber means of greater resiliency than the body portion interposed between the back face of said elevated portion and the solid heel for directly resisting the initial flattening of the elevated portion.

5. A rubber heel-lift having a body portion adapted to be attached to a solid heel, said body portion having a tread face and a normally elevated portion projecting therefrom constructed to flatten into the plane of said tread face under pressure, and rubber means of greater resiliency than the body portion integrally connected to the back face of said elevated portion and rising clear therefrom, normally inactive, for directly resisting the initial flattening of the elevated portion.

6. The combination with a shoe having a heel, of a cushion lift secured to the under face of the heel and having a concavity in its upper face and a substantial convexity on its lower face, said cushion lift being provided within the concavity with a post having its upper end in the plane of the shoe heel, the post offering immediate resistance to the initial depression of the convexity and continued and increasing resistance as the depression of the convexity is increased.

7. The combination with a shoe having a heel, of a cushion lift secured to the under face of the heel and having a concavity in its upper face and a substantial convexity on its lower face, said cushion lift being provided within the concavity with a post having its upper end in the plane of the shoe heel, the post offering immediate resistance to the initial depression of the convexity and continued and increasing resistance as the depression of the convexity is increased, the post being hollowed out at the upper end to provide an annular extremity which is normally in superficial contact with the shoe heel.

In testimony whereof I have signed my name to this specification.

HARRY G. NORWOOD.